(12) United States Patent
Rastogi et al.

(10) Patent No.: US 10,635,666 B2
(45) Date of Patent: Apr. 28, 2020

(54) SYSTEM, METHOD AND DEVICE FOR INDEX COMPILATION TO OPTIMIZE INDEX USAGE

(71) Applicant: Huawei Technologies Co., Ltd., Shenzhen (CN)

(72) Inventors: Kumar Rajeev Rastogi, Bangalore (IN); Dilip Kumar, Bangalore (IN); Nirmala Sreekantaiah, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 15/658,028

(22) Filed: Jul. 24, 2017

(65) Prior Publication Data
US 2017/0329822 A1 Nov. 16, 2017

Related U.S. Application Data

(63) Continuation of application No. PCT/CN2015/095704, filed on Nov. 26, 2015.

(30) Foreign Application Priority Data

Mar. 21, 2015 (IN) .......................... 1439/CHE/2015

(51) Int. Cl.
*G06F 16/2453* (2019.01)
*G06F 16/22* (2019.01)
(Continued)

(52) U.S. Cl.
CPC ............ *G06F 16/2453* (2019.01); *G06F 8/41* (2013.01); *G06F 9/44521* (2013.01); *G06F 16/2228* (2019.01); *G06F 16/2282* (2019.01)

(58) Field of Classification Search
CPC .... G06F 3/167; G06F 16/00; G06F 16/24568; G06F 16/90335; G06F 17/2217;
(Continued)

(56) References Cited

U.S. PATENT DOCUMENTS 6,052,693 A    4/2000  Smith et al.
6,968,335 B2  11/2005  Bayliss et al.
(Continued)

FOREIGN PATENT DOCUMENTS

CN    1412694 A    4/2003
CN  101021875 A    8/2007
WO      9801811    1/1998

OTHER PUBLICATIONS

US 5,909,685 A, 06/1999, Smith et al. (withdrawn)
(Continued)

*Primary Examiner* — Angelica Ruiz
(74) *Attorney, Agent, or Firm* — Slater Matsil, LLP (57) ABSTRACT

Embodiments relate to a system, method, and device for index compilation to optimize index. Once a CREATE INDEX commands is fired, a first check determines if the user requested has to compile this index. If the index is to be compiled, a corresponding C-file is generated, and a DLL is generated out of the C-file. The DLL is then loaded with server. An INDEX DLL is natively compiled and generated corresponding to each INDEX during definition. The INDEX DLL will contain the required structure and method to perform on INDEX, based on the indexed column datatype.

17 Claims, 6 Drawing Sheets

(51) Int. Cl.
 *G06F 8/41* (2018.01)
 *G06F 9/445* (2018.01)
(58) Field of Classification Search
 CPC .... G06F 8/41; G06F 16/2228; G06F 16/2282; G06F 16/2453; G06F 16/289; G06F 9/44521
 USPC .......... 707/600–831, 899, 999.001–999.206
 See application file for complete search history.

(56) References Cited

U.S. PATENT DOCUMENTS

| | | | | |
|---|---|---|---|---|
| 7,110,431 | B2* | 9/2006 | Oates | H04B 1/707 375/130 |
| 8,526,743 | B1* | 9/2013 | Campbell | G06K 9/6202 382/181 |
| 2004/0098359 | A1 | 5/2004 | Bayliss et al. | |
| 2006/0061795 | A1* | 3/2006 | Walmsley | G06F 21/73 358/1.14 |
| 2006/0132822 | A1* | 6/2006 | Walmsley | G06F 12/1408 358/1.14 |
| 2006/0294312 | A1* | 12/2006 | Walmsley | H04L 9/0662 711/122 |
| 2008/0005093 | A1* | 1/2008 | Liu | G06F 16/86 |
| 2013/0204886 | A1* | 8/2013 | Faith | G06Q 30/0631 707/756 |
| 2014/0280030 | A1* | 9/2014 | Freedman | G06F 16/24542 707/718 |
| 2015/0088924 | A1* | 3/2015 | Abadi | G06F 16/90335 707/769 |

OTHER PUBLICATIONS

Freedman et al., "Compilation in the Microsoft SQL Server Hekaton Engine," Bulletin of the IEEE Computer Society Technical Committee on Data Engineering, 2014, 9 pages.

Zhang, Rui, "Micro-Specialization: Dynamic Code Specialization in DBMSES," A Dissertation Submitted to the Faculty of the Department of Computer Science, In the Graduate College, The University of Arizona, Aug. 1, 2012, 135 pages.

Zhang et al., "Micro-specialization: Dynamic code specialization of database management systems," Research output: Chapter in Book/Report/Conference proceeding > Conference contribution, Aug. 9, 2017, 3 pages.

* cited by examiner

```
Typedefstructindexname_id
{
Intid1;
}indexname_id;
Index_getattr(char*buf,attnum)
{
   Switch(attnum)
   {
      case 1:
         return((indexname_id*)(buf))->id1;
         .
         .
         .
   }
}
Find_slot_for_tuple(intkey)
{
        value=index_getattr(tuple);
cmpresult=int4cmp(key,value)
        /*return the compare output*/
}
```

Defines the column list in index. If more columns in index, add fields corresponding to those in this structure.

Define the specialized function to access index tuple value. Get the value of other index, if more fields are there.

Define the specialized code to find the appropriate slot for the index tuple. If more index columns are there and first field is equal, then similarlary compare the next field. If next field is char, then use the corresponding comparison

On 100K record insertion, overall CPU instruction reduced by 11% and for the key compare function reduced by almost 75%

FIGURE 6

SYSTEM, METHOD AND DEVICE FOR INDEX COMPILATION TO OPTIMIZE INDEX USAGE

CROSS-REFERENCE TO RELATED APPLICATIONS

This application is a continuation of International Application No. PCT/CN2015/095704, filed on Nov. 26, 2015, which claims priority to India Patent Application No. IN1439/CHE/2015, filed on Mar. 21, 2015. The disclosures of the aforementioned applications are hereby incorporated by reference in their entireties.

TECHNICAL FIELD

The present subject matter described herein, in general, relates to relational database management systems, and more particularly towards enhancing the performance of the central processing unit during the execution any query by index compilation.

BACKGROUND

Structured query language (SQL) is a kind of database query and programming language which is used to store, retrieve and query the data held in the relational database system.

The sequential query language's (SQL) development began in 1974, proposed by Boyce and Chamberlin, at that time called SEQUEL; In 1976, IBM Corporation's Sanjase research institute when developed RDBMS SYSTEM R changes SQL; ORACLE Corporation published first in 1979 based on the SQL commercialization RDBMS product; American country Standardization organization ANSI in 1986 announced that SQL takes the database industrial standard. It is well known that the SQL language contains four parts:

Data definition language (DDL), contains CREATE, DROP, ALTER.
Data manipulation language (DML) contains INSERT, UPDATE and DELETE.
Data Query language (DQL), contains SELECT.
Data management language (DCL) contains SQL statements such as GRANT, REVOKE, COMMIT, and ROLLBACK.

Any SQL statement is processed by the RDBMS in the following steps:
1. Parse (Syntax Check): It parses the SQL statement syntax and decides whether it conform to the standard.
2. Analyze: It checks whether the objects (tables, columns, etc.) used in SQL statement exist in Database. This phase will extract any bind variable if there are any.
3. Optimize: It chooses the best plan for query execution based on cost.
4. Execute: It executes the best plan generates in previous step and returns the result.

During query execution, Indexing is one of the important data structures that improve the speed of data retrieval operations on a database table at the cost of additional writes and storage space to maintain the index data structure. INDEX is created on particular column of a table to keep the tuples organized and hence access of those tuple becomes faster. Index data segment stores only the value of column being part of index, and all other fields of table are stored in heap data segment. During creation of index only, it becomes clear that what data-type value is going to be stored in index data segment. Since the data-type of indexed column is known during its creation, so all of the access method to various operation on index also remains constant. Some of the top operation done on indexes may include but not limited to access of index tuple, finding slot to insert a particular index tuple, search of any index tuple, and the like.

In the recent past to improve the performance of databases, the approach identified is to reduce the CPU instructions for a given operation. In this context there are works available in the prior-art where a query is compiled into native format and then executed. A further improvement of this technology is to optimize the query execution by compiling access method to a table. In this case the performance of access is improved. MemSQL, Micro-Specialization in DBMSes, SQL Server 2014 are few examples of such specialization. These solutions offer mechanism to compile table schema to native code during "TABLE CREATION" time.

In order to do operation like INSERT on INDEX column, according to prior-art techniques available, first it finds the appropriate position for example in B-Tree, where it can store the new data and still maintaining the sorted order of data. Similarly to do SEARCH operation on any index, it does the comparison of the node (e.g. binary search for BTree index). For index the comparison and infrastructure function constitute most of index cost. All these comparison and infrastructure functions are implemented in a very generic way to handle all data-types of columns and all kinds of INDEX.

SUMMARY

This summary is provided to introduce concepts related to system, method, and device for index compilation to optimize index usage and the concepts are further described below in the detailed description. This summary is not intended to identify essential features of the claimed subject matter nor is it intended for use in determining or limiting the scope of the claimed subject matter.

Since the code/logic for comparison and other infrastructure is very generic, it needs to consume many more CPU instruction to decide which part of the code to be executed, which results increase in overall CPU instruction to execute a query and hence performance slow-down. Accordingly, the time and cost of CPU also increases and the efficiency of the overall system decreases.

Embodiments of the present invention provide a mechanism to efficiently and economically solve the above-mentioned technical problem by natively compiling and generating a file (for example, an INDEX DLL) corresponding to each INDEX during definition, which will contain all required structure and method to perform any operation on INDEX based on the indexed column data-type.

To improve the overall performance of CPU during query execution by reducing the number of CPU instruction required for the execution of query, embodiments of the present invention provide a plurality of aspects of the present application. The plurality of aspects provides a method, a device, and a system for index compilation to optimize index usage. The technical solutions are as follows.

In one aspect, a system for compiling an INDEX for making data available from a database, responsive to one or more query comprising at least one command to compile the INDEX is disclosed. The system comprises of a processor configured to natively compile the query, in response to the command. The processor is also configured to generate a C-file corresponding to each INDEX in the query. The processor is further configured to thereby generate a shared object file, based on the C-file generated, comprising at least one structure and at least one mechanism to perform at least one operation on an INDEX based on an indexed column in the database. The shared object file is a dynamic link library file.

In another aspect, a device for compiling an INDEX for making data available from a database, responsive to one or more query comprising at least one command to compile the INDEX is disclosed. The device comprises of an input/output hardware for receiving the query for querying the database; and a processor. The processor is configured to natively compile the query, in response to the command. The processor is also configured to generate a C-file corresponding to each INDEX in the query, and thereby generate a shared object file, based on the C-file generated, comprising at least one structure and at least one mechanism to perform at least one operation on an INDEX based on an indexed column in the database. The shared object file is a dynamic link library file.

In yet another aspect, a method for compiling an INDEX for making data available from a database, responsive to one or more query comprising at least one command to compile the INDEX is disclosed. The method comprises receiving the query for querying the database. The method also comprises identifying, by a processor, the query. The query comprises of "CREATE INDEX" statement with a command to create the file by compiling the INDEX. The method further comprises natively compiling the query, in response to the command, to generate a C-file corresponding to each INDEX in the query, and thereby generating a shared object file, based on the C-file generated, comprising at least one structure and at least one mechanism to perform at least one operation on an INDEX based on an indexed column in the database. The shared object file is a dynamic link library file.

In implementations of embodiments of the present invention, using the above mentioned technical solutions reduce the number of instruction by eliminating the generic code and hence improve performance on INDEX operation.

In implementations of embodiments of the present invention. using the above mentioned technical solutions improves the planning on this INDEX by considering micro-specialization property of INDEX.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems, methods and devices for natively compiling and generating an INDEX DLL corresponding to each INDEX during definition, which will contain all required structure and method to perform on INDEX based on the indexed column data-type is disclosed.

It may be understood by the person skilled in the art that native compilation in SQL servers (Source: Internet) is directed towards natively compiling stored procedures that access memory-optimized tables. SQL Server may also able to natively compile memory-optimized tables. Native compilation allows faster data access and more efficient query execution than interpreted (traditional) Transact-SQL. Native compilation of tables and stored procedures produce DLLs. Native compilation may also refer to the process of converting programming constructs to native code, consisting of processor instructions without the need for further compilation or interpretation. Whereas, in ORACLE (Source: Internet), when PL/SQL is loaded into the server it is compiled to byte code before execution. The process of native compilation converts PL/SQL stored procedures to native code shared libraries which are linked into the kernel resulting in performance increases for the procedural code. The extent of the performance increase depends on the content of the PL/SQL. The compilation process does not affect the speed of database calls, only the procedural logic around them such as loops and calculations.

It may be understood by the person skilled in the art that Dynamic-link library (also written unhyphenated) (Source: Internet/Wikipedia), or DLL, is Microsoft's implementation of the shared library concept in the Microsoft Windows and OS/2 operating systems. These libraries usually may have the file extension DLL, OCX (for libraries containing ActiveX controls), or DRV (for legacy system drivers). The file formats for DLLs are the same as for Windows EXE files—that is, Portable Executable (PE) for 32-bit and 64-bit Windows, and New Executable (NE) for 16-bit Windows. As with EXEs, DLLs can contain code, data, and resources, in any combination. Data files with the same file format as a DLL, but with different file extensions and possibly containing only resource section can be called resource DLLs. Examples of such DLLs include icon libraries, sometimes having the extension ICL, and font files, having the extensions FON and FOT.

It may also be understood by the person skilled in the art that schema is a general term for any object (e.g. table or index definition). So schema binding means whatever object definition is given as per that definition access of object column data is bounded. Then, at run time while accessing the column data will be using less number of CPU instruction and hence faster access of column. For example, an index may be created as index idx on tbl (int a, int b). Then, to access the value of attribute as per current technology, it has go through generic code flow to get the length of each attribute, offset of each attribute and many other parameter to access the value. But, as per schema binding, since it is already known that the index has just two integer column, a structure such as struct tbl(int a; int b;) can be directly typecast, and the value of each attribute can be fetched. Thus, schema binding has saved so many CPU instructions to fetch the attribute value.

In one implementation, an embodiment of the present invention provides a new modified syntax for "CREATE INDEX" which will enhance the performance of CPU and ultimately the overall working the system will be enhanced. CREATE INDEX syntax may be modified to specify the additional property of index based on which it will compiled so as to generate INDEX DLL. For example, for CREATE [UNIQUE] INDEX [CONCURRENTLY] [name] ON table_name . . . [WHERE predicate] [COMPILE] i.e. at the end of the CREATE INDEX existing syntax, add the optional option at the end of it. In one example, the syntax enables a user to provide an option to create index along with schema binding.

In one implementation, the new option provided along with CREATE INDEX to compile it, may be stored in system table of corresponding INDEX. In one example, new option received from user via. Query is stored in database.

In one implementation, an embodiment of the present invention generates index DLL corresponding to each INDEX definitions.

In one implementation, an embodiment of the present invention converts the INDEX definition in a machine language translation and the access methods in the INDEX definition.

While aspects are described or index compilation to optimize index usage may be implemented in any number of different computing systems, environments, and/or configurations, the embodiments are described in the context of the following exemplary system.

Figure 1:
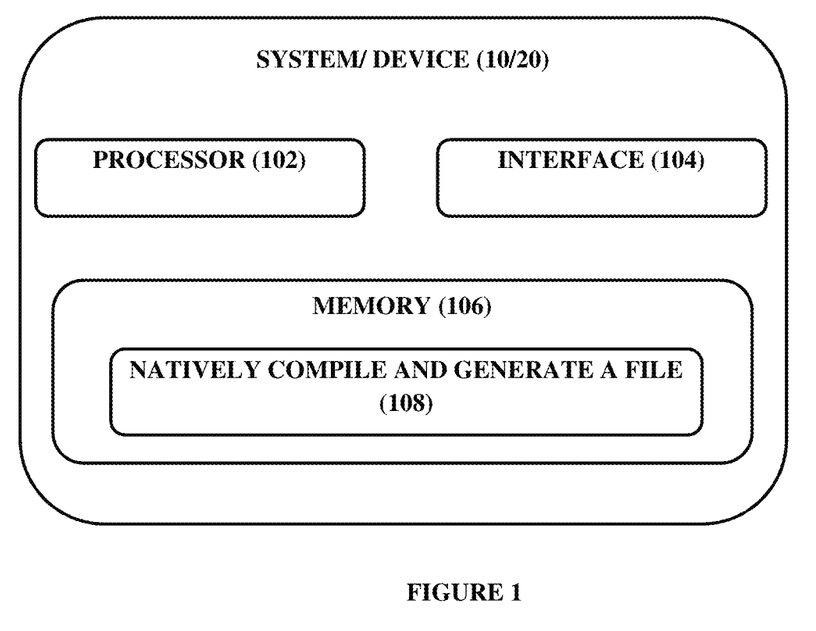
FIG. 1 illustrates a system or a device for compiling an INDEX for making data available from a database, responsive to one or more query comprising at least one command to compile the INDEX, in accordance with an embodiment of the present subject matter.

FIG. 1 illustrates a system 10 or a device 20 for compiling an INDEX for making data available from a database, responsive to one or more query comprising at least one command to compile the INDEX, in accordance with an embodiment of the present subject matter.

In one implementation, the system 10 includes a data processor 102, a stored database and a plurality of database tables having a plurality of database relations, wherein data is retrieved by the processor by means of query commands performing a plurality of operations on the database relations.

In one implementation, a system for compiling an INDEX for making data available from a database, responsive to one or more query comprising at least one command to compile the INDEX is disclosed. The system comprises a processor. The processor is configured to natively compile the query, in response to the command. The processor is also configured to generate a C-file corresponding to each INDEX in the query, and thereby generate a shared object file, based on the C-file generated, comprising at least one structure and at least one mechanism to perform at least one operation on an INDEX based on an indexed column in the database. The shared object file is a dynamic link library file.

In one implementation, a device for compiling an INDEX for making data available from a database, responsive to one or more query comprising at least one command to compile the INDEX is disclosed. The device comprises of an input/output hardware for receiving the query for querying the database. The device also comprises a system for compiling an INDEX for making data available from a database, responsive to one or more query comprising at least one command to compile the INDEX. The system comprises a processor. The processor is configured to natively compile the query, in response to the command. The processor is also configured to generate a C-file corresponding to each INDEX in the query, and thereby generate a shared object file, based on the C-file generated, comprising at least one structure and at least one mechanism to perform at least one operation on an INDEX based on an indexed column in the database. The shared object file is a dynamic link library file.

In one implementation, an embodiment of the present invention is configured to create, based on the query received, a structure corresponding to the index. Then, the embodiment is also configured to generate, based on the query received, specifically based on the INDEX definition given as part of CREATE INDEX command, at least one access function for an index tuple value, and at least one instructions to find an appropriate slot for an index tuple, wherein the number of access functions generated for each INDEX are always same. The embodiment is also configured to store the structures created, the access function generated, and the access function generated in a buffer, and create a C-file based on stored structure, access function and instructions. The embodiment is also configured to compile the C-file created using at least one pre-stored compiler. The embodiment is thereby configured to generate a file from the C-file. The file is a dynamic link library file; and load the file along with at least one executable files in the system for an execution of the query.

In one implementation, the shared object file comprises of at least one of list of columns in the INDEX, one or more access function for an index tuple value, one or more instructions to find an appropriate slot for an index tuple, and any combination thereof.

In one implementation, embodiments of the present invention further create a system table for the INDEX, and thereby store an option depending on if INDEX needs to be compiled or not. The option is selected from at least one of "true" if command to create the file is present in the query or "false" if command to create the file is not present in the query.

In one implementation, the shared object file comprises of one or more function pointers generated for the INDEX. The function pointers generated are stored in one or more relation descriptor table.

In one implementation, the relation descriptor is stored a cache memory created for all relations, and is formed using the system table of the corresponding relation (i.e., table/index).

In one implementation, the shared object file is generated when a query is received, and if the query has a command to compile the INDEX. The system generates a C-file based on the INDEX and the query received, and then generates a shared object file by compiling the C-file generated.

In one implementation, the shared object file is used by at least one of application, other dynamic link library, and any combination thereof.

In one implementation, the shared object file is named while creating the INDEX, based on: a name of INDEX, wherein the name of the INDEX is obtained along with the CREATE INDEX query; and a unique number, generated by the system, as identifier assigned to each index. The shared object file is created with the name of the C-file as concatenation of the name and the identifier.

In one implementation, when a new query is received, the system is configured to check if an INDEX received along with the query is schema bounded. A flag is provided to indicate if tuple belong to a schema bounded index. If the index is schema bounded, the system is configured to utilize the function pointers stored into the corresponding relation descriptor associated with the INDEX, and to call the shared object file generated for the execution of the new query.

In one implementation said query is received in a format comprising CREATE INDEX query along with [COMPILE] option.

In one implementation, the system 10 and/or device 20 may be implemented in a variety of computing systems, such as a laptop computer, a desktop computer, a notebook, a workstation, a mainframe computer, a server, a network server, and the like. It will be understood that the system 10 and/or device 20 may be accessed by multiple users through one or more smart devices (herein after, device) or client machine (not shown), or applications residing on the user devices (not shown). Examples of the device 20 may include, but are not limited to, a portable computer, a personal digital assistant, a handheld device, and a workstation. The system 10 may be communicatively coupled to one or other devices using a network.

In one implementation, the system 10 may communicate with the databases by sending or firing one or more queries related to the data present in the database. It is understood that the query fired on the database may be selected from any of the existing queries in the traditional approach. Specifically, the query is received in a format comprising CREATE INDEX query along with [COMPILE] option. The databases respond to the query fired by providing the required result for the database. It is also understood that when the system 10 and/or device 20 may be accessed by multiple users through one or more user devices or client machine, or applications residing on the user devices, the query is fired is forwarded to the databases using the system 10 or device 20.

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one implementation, the processor or processing unit 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions stored in a memory.

In one implementation, the memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the modules stored in the memory 106 include routines, programs, objects, components, data structures, etc., which perform particular tasks or implement particular abstract data types. In one implementation, the modules may include may include programs or coded instructions that supplement applications and functions of the system 10 and/or device 20.

In one implementation, the system 10 and or device 20 may include an input/output (I/O) interface or input/output hardware providing an interface 104. Using interface 104 the user may fire the query and may also see the output generated by the system 10 and/or device 20. The I/O interface 104 may include a variety of software and hardware interfaces, for example, a web interface, a graphical user interface, and the like. The I/O interface 104 may allow the system 10 or device 20 to interact with a user directly or through the client devices. Further, the I/O interface 104 may enable the system 10 and/or device 20 to communicate with other computing devices, such as web servers and external data servers (not shown). The I/O interface 104 can facilitate multiple communications within a wide variety of networks and protocol types, including wired networks, for example, LAN, cable, etc., and wireless networks, such as WLAN, cellular, or satellite. The I/O interface 104 may include one or more ports for connecting a number of devices to one another or to another server.

Figure 2:
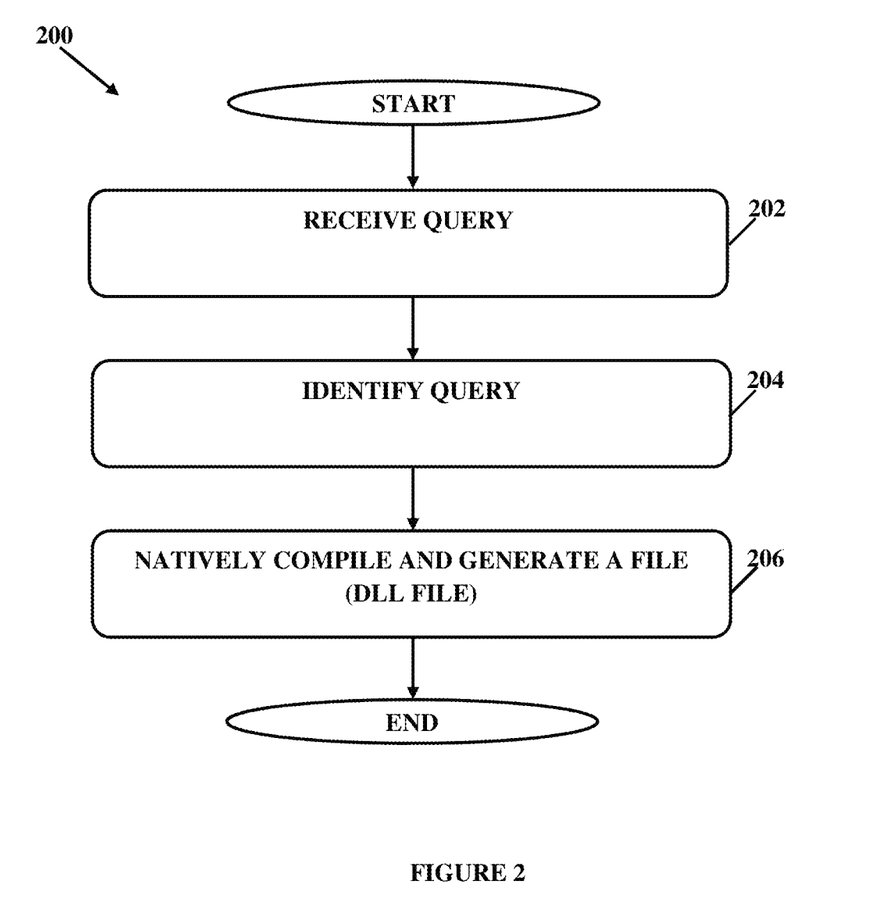
FIG. 2 illustrates a method for compiling an INDEX for making data available from a database, responsive to one or more query comprising at least one command to compile the INDEX, in accordance with an embodiment of the present subject matter.

FIG. 2 illustrates a method for compiling an INDEX for making data available from a database, responsive to one or more query comprising at least one command to compile the INDEX. The method 200 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternate methods. Additionally, individual blocks may be deleted from the method 600 without departing from the scope of the subject matter described herein. Furthermore, the method can be implemented in any suitable hardware, software, firmware, or combination thereof. However, for ease of explanation, in the embodiments described below, the method may be considered to be implemented in the above described system 10 and/or device 20.

In one implementation, based on the option given along with CREATE INDEX, the definition of INDEX may be generated as per below flow given in the FIG. 2.

In one implementation, once a CREATE INDEX commands is fired, first a method checks if the user query requested has to compile the provided index or not, if yes then generate corresponding C-file and then generate DLL out of the C-file by compiling it, and load the DLL with server executables for further processing of the query. An embodiment of the invention stores the compile option as true along with this index entry in the system table. If index compilation is not requested by user, then it should go ahead as normal execution.

At block 202, a query is received from the user. The query received is for querying the database to perform at least one operation on the database table. The operation may include but not limited to update, delete, search, create and the like.

At block 204, the query received is identified to check if the query includes the option to compile the Index or not. If the query does not include the option to compile the index, the query is executed in convention way/methodology. In one example, the query comprises of "CREATE INDEX" statement with a command to create the file by compiling the INDEX. When the query comprises of the command to compile the method moves to the next block.

At block 206, the query comprising the command is natively compiled, by the processor, in response to the command, and a file corresponding to each INDEX in the query is generated. In one implementation, the file comprises of at least one structure and at least one mechanism to perform at least one operation on an INDEX based on an indexed column in the database.

In one implementation, a method comprises receiving the query for querying the database. The method also comprises identifying, by a processor, the query. The query comprises of "CREATE INDEX" statement with a command to create the file by compiling the INDEX. The method also comprises natively compiling the query, in response to the command, to generate a C-file corresponding to each INDEX in the query, and thereby generating a shared object file, based on the C-file generated, comprising at least one structure and at least one mechanism to perform at least one operation on an INDEX based on an indexed column in the database. The shared object file is a dynamic link library file.

In one implementation, the method further comprises of creating, by the processor, based on the query received, a structure corresponding to said index. The method also comprises generating, by the processor, based on the query received, specifically based on the INDEX definition given as part of CREATE INDEX command, at least one access function for an index tuple value, and at least one instructions to find an appropriate slot for an index tuple. The number of access functions generated for each INDEX are always same. The method also comprises storing, by the processor, the structures created, the access function generated, and the access function generated in a buffer, and creating a C-file based on stored structure, access function and instructions. The method also comprises compiling, by the processor, the C-file created using at least one pre-stored compiler. The method thereby generates a file from said C-file, wherein the file is a dynamic link library file. The method further comprises loading, by the processor, the file along with at least one executable files in the system for an execution of the query.

In one implementation, the shared object file comprises of at least one of list of columns in the INDEX, one or more access function for an index tuple value, one or more instructions to find an appropriate slot for an index tuple, and any combination thereof.

In one implementation, the method creating a system table for the INDEX, and thereby store an option depending on if INDEX needs to be compiled or not. The option is selected from at least one of "true" if command to create the file is present in the query or "false" if command to create the file is not present in the query.

In one implementation, the shared object file comprises of one or more function pointers generated for the INDEX. The function pointers generated are stored in one or more relation descriptor table.

In one implementation, the relation descriptor is stored a cache memory created for all relations, and is formed using the system table of the corresponding relation. Relation descriptor is formed using the system table of the corresponding relation. In one example, whenever a relation descriptor for index is created, we check if the index is schema bounded, if yes, then form the DLL file name (by concatenating the index name and index id) and then link the file with server executables (by using the function dlopen or any of the existing functions).

In one implementation, the method further comprises of generating the shared object file when a query is received. If the query has a command to compile the INDEX, then the system generates a C-file based on the INDEX and the query received. The method thereby generates a shared object file by compiling the C-file generated.

In one implementation, the shared object file is used by at least one of application, other dynamic link library, and any combination thereof.

In one implementation, the shared object file is named while creating the INDEX, based on: a name of INDEX, wherein the name of the INDEX is obtained along with the CREATE INDEX query; and a unique number, generated by the system, as identifier assigned to each index. The shared object file is created with the name of the C-file as concatenation of the name and the identifier.

In one implementation, when a new query is received, a method comprises checking, by the processor, if an INDEX received along with the query is schema bounded. A flag is provided to indicate if tuple belong to a schema bounded index. If the index is schema bounded, the method also comprises utilizing, by the processor, the function pointers stored into the corresponding relation descriptor associated with the INDEX, to call the shared object file generated for the execution of the new query.

In one implementation, the query is received in a format comprising CREATE INDEX query along with [COMPILE] option.

In one implementation, the generated function pointers will be retrieved from INDEX DLL and the same may be stored in relation descriptor.

Figure 3:
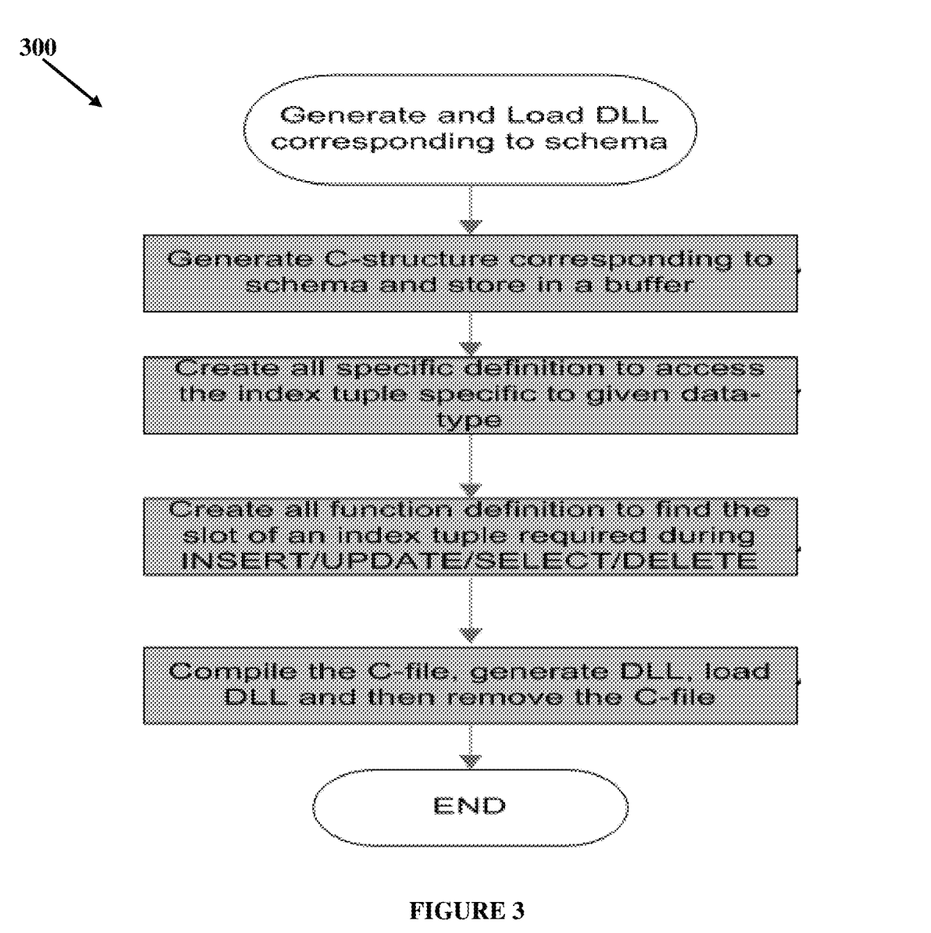
FIG. 3 illustrates an exemplary method for generation of DLL, in accordance with an embodiment of the present subject matter.

FIG. 3 illustrates an exemplary method 300 for generation of DLL, in accordance with an embodiment of the present subject matter.

In one implementation, when the query comprising the command to compile the index is received, the present invention generates DLL and loads the DLL corresponding to schema along with the other available executables for further processing of the query, in the following manner.

Create a C-structure corresponding to INDEX schema, i.e. if INDEX is on two integer columns, then generate structure as: Struct idx_xxx {int a; int b}.

Then generate all access method function and function corresponding to finding the insertion slot. Keep storing all generated structure and function in a buffer.

Finally write whole buffer in the C-file.

Then using an appropriate compiler, generate DLL out of the C-file and then remove the C-file.

Finally open the DLL file to load the DLL file along with the SERVER executable.

Figure 4:
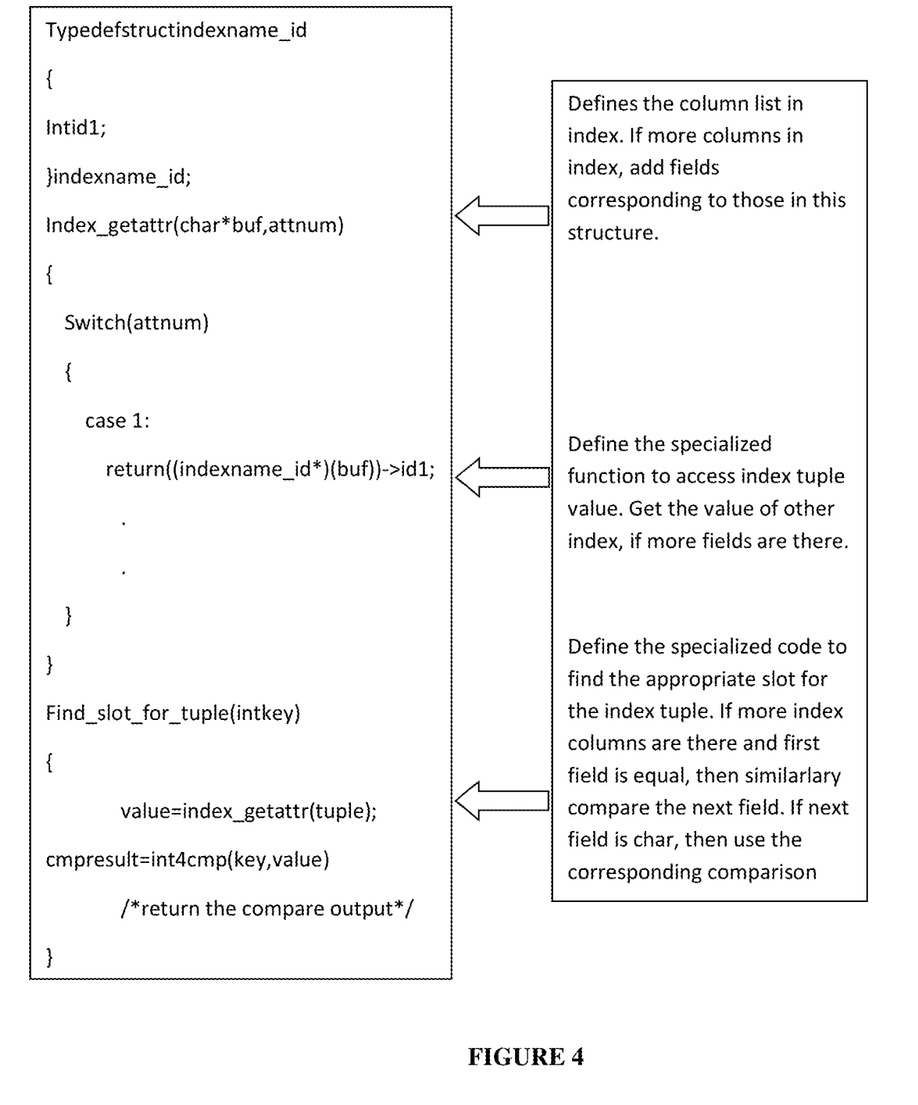
FIG. 4 illustrates an exemplary Code snapshot of generated C-file from which DLL will be generated, in accordance with an embodiment of the present subject matter.

FIG. 4 illustrates an exemplary Code snapshot of generated C-file from which DLL will be generated, in accordance with an embodiment of the present subject matter.

In one implementation, if following schema is considered as an example:
CREATE TABLE TBL(ID1 INT, ID2 INT, ID3 INT);
CREATE INDEX IDX ON TBL(ID1) COMPILE So based on the above schema, user wishes to create an index on table TBL using the column ID1 of data-type INT. Also user has requested for the INDEX definition to be compiled and generate corresponding DLL. Code snapshot of generated C-code from which DLL will be generated will be as shown in FIG. 4.

In one example, the c-structure generated may include the list of columns in the index, specialized function to access index tuple value, specialized code to find an appropriate slot for the tuple index. In one implementation, if more columns are present in the index the invention enable to add fields corresponding to those in this structure. Further, if there are more fields the value of other index are also fetched.

In one example, corresponding to each column in the index, a member variable of same type is created in the structure. At the end the structure definition will have same number of variables as number of columns in index.

For example, if CREATE INDEX idx on tbl(id1, id2), where id1 and id2 are of type int. So it will create a structure as:

```
struct idx_xxx
{
    int a;
    int b;
}
```

Figure 5:
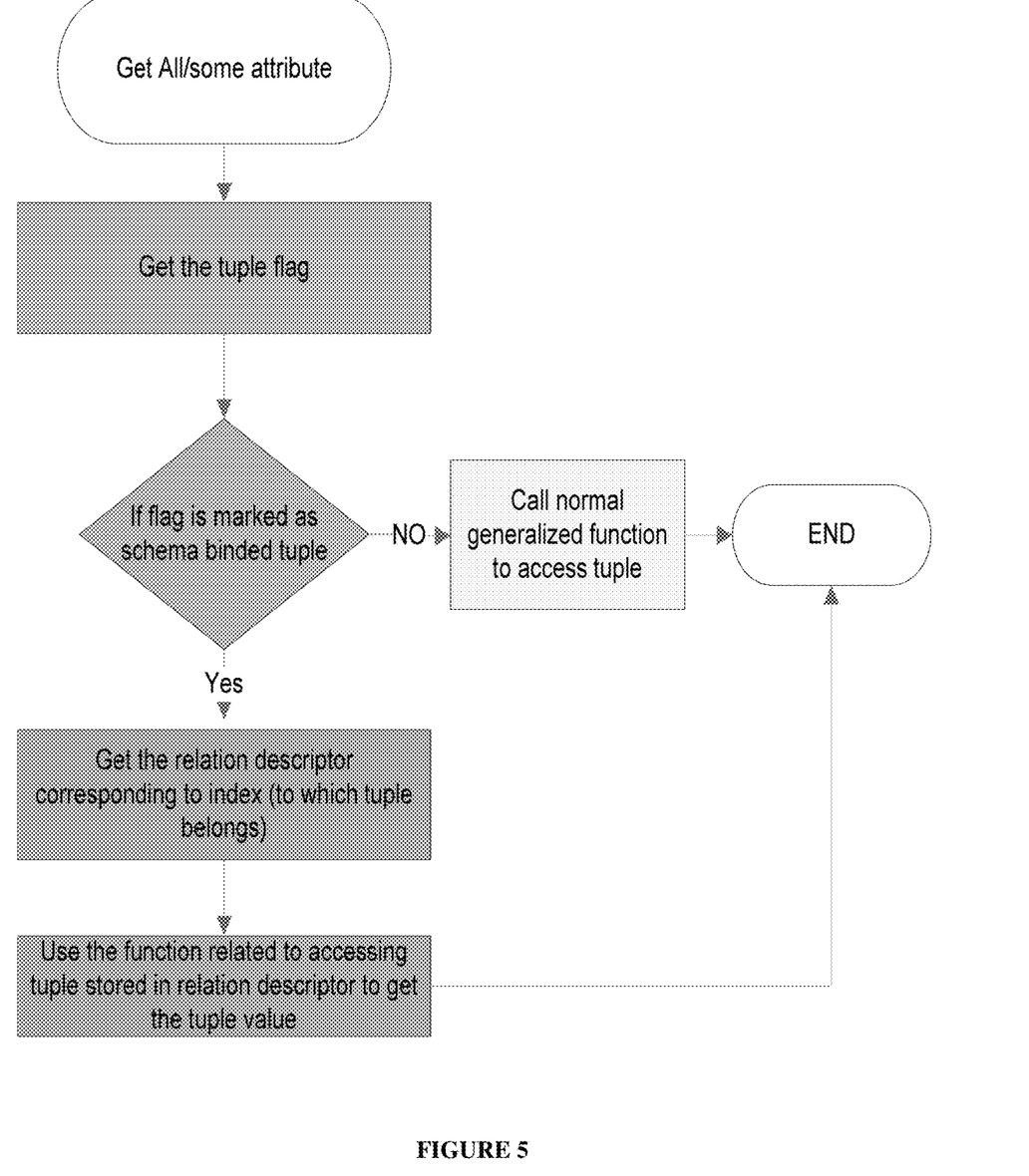
FIG. 5 illustrates an exemplary method for invocation of specialized function generated when a new query is fired, in accordance with an embodiment of the present subject matter.

FIG. 5 illustrates an exemplary method for invocation of specialized function generated when a new query is fired, in accordance with an embodiment of the present subject matter.

In one implementation, when a new query is fired Invocation of specialized function generated is shown in FIG. 5.

In one implementation, based on the index id, get its relation descriptor and check if it was enabled with specialization/compilation of the code. If yes, then get the corresponding function pointers from descriptor and call this function instead of normal generalized function call.

In one implementation, while getting all or some attribute, first check if the index is schema bounded, if not then continue with execution of normal access method functions otherwise get the relation descriptor of the corresponding index and then use the corresponding access method function address (stored in relation descriptor) to call the compiled version of access method.

Working Example: Experiment Results

Figure 6:
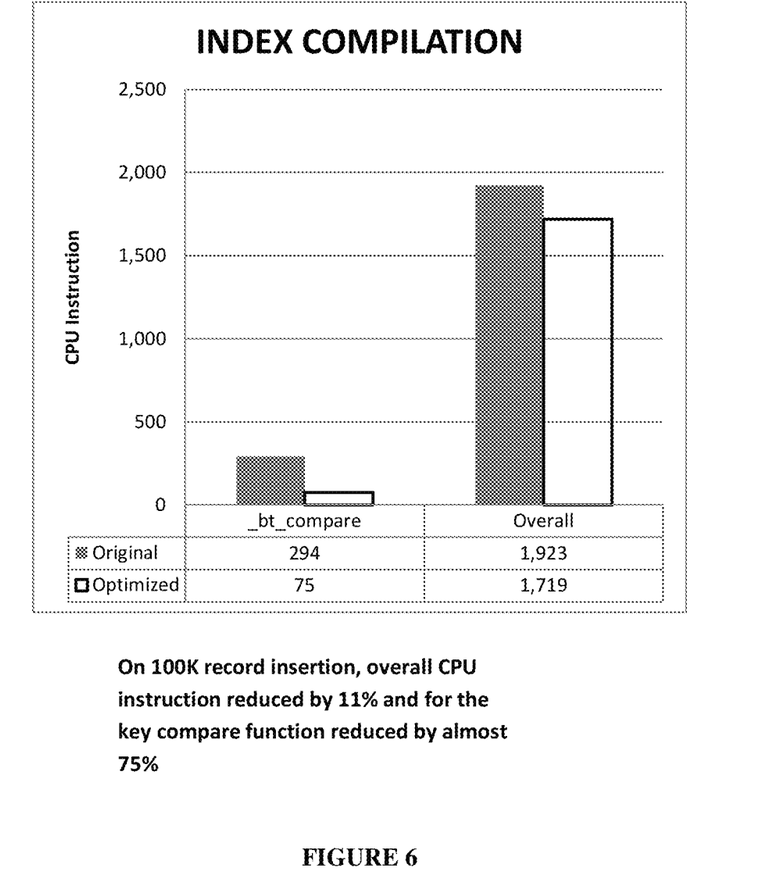
FIG. 6 illustrates an experiment result on PG 9.4 usage of native compilation on B tree index, in accordance with an embodiment of the present subject matter.

FIG. 6 illustrates an experiment result on PG 9.4 usage of native compilation on B tree index, in accordance with an embodiment of the present subject matter.

In one example, the present invention was implemented on PostgreSQ (PG) 9.4 usage of native compilation on Btree index with following schema:
CREATE TABLE TBL(ID1 INT, ID2 INT, ID3 INT)
CREATE INDEX IDX ON TBL(ID1);
And 100 k records insertion the overall CPU instructions reduced by 11% and for the function comparable reduced by almost 75%. The index compilation result is shown on FIG. 6.

In another example, if there are multiple possible indexes on any table, then we can give more priority to choose compiled index.
E.g. consider two index as below:
CREATE INDEX IDX1 ON TBL(ID1);
CREATE INDEX IDX2 ON TBL2(ID1, ID2) COMPILE;
and the query as:
SELECT ID1, ID3 FROMTBL WHERE ID1<100;
In a traditional database, it will always select the IDX1 for scan, as it is small. But as per embodiments of the present invention, since IDX2 is compiled index, access using this index will be cheaper and hence we can opt to choose the IDX2 instead of IDX1. In order to validate that what index has been chosen, we will add the COMPILE property of index along with EXPLAIN plan.

Embodiments of the present invention may provide certain advantages. Though not required to practice aspects of the disclosure, these advantages may include the following. First, the number of instructions are reduced by eliminating the generic code and hence improves performance on INDEX operation. Second, embodiments of the present invention improve the planning on this INDEX by considering micro-specialization property of INDEX. Third, embodiments of the present invention explicitly focus on the INDEX of the schema whereas earlier schema binding does not have anything regarding the INDEX. Fourth, embodiments of the present invention work when user provides an option along with CREATE INDEX, to generate INDEX DLL. The INDEX DLL contains all structure and methods to operate on the index in very specific way of only this index. Fifth, embodiments of the present invention generate and INDEXE DLL irrespective of table state. For example, if user has given option to create index in the schema bounded form (i.e. along with DLL), then irrespective of table (on which index is getting created) is schema bounded or not index will be created in schema bounded form. Table state means whether table is schema bounded or normal table. 6. Sixth, embodiments of the present invention use schema binding property of index to select one of the indexes for scanning during the execution. Plan is an existing database mechanism, which generate an execution plan corresponding to a query. For any query there may be multiple way of executing the query, so the optimizer module of database tries to generate most efficient "Plan", which in turn will make the execution of the query faster. For example, Plan decides what kind of scan (index or sequence) to be used to scan a table. Showing the index as part of the plan generated is not part of this invention. This is already done by all RDBMS. But as per embodiments of the present invention, while showing the index as part of the plan, the property of index (i.e. schema bounded or not) is displayed along with the index chosen for scan in the plan. Seventh, embodiments of the present invention explains plan of any SQL query using the compiled INDEX shows the same during the execution.

Although implementations for system, method, and device for index compilation to optimize index usage have been described in language specific to structural features and/or methods, it is to be understood that the appended claims are not necessarily limited to the specific features or methods described. Rather, the specific features and methods are disclosed as examples of implementations for system, method, and device for index compilation to optimize index usage.

What is claimed is:

1. A device comprising:
a transceiver configured to receive a query for querying a database;
a processor configured to specify the query, wherein the query comprises a "CREATE INDEX" statement with a command to create a file by compiling an INDEX, for making data available from the database; and
a memory coupled with the processor, wherein in response to the command to compile, the memory is configured to provide the processor with instructions to natively compile the query, in response to the command, to generate a C-file corresponding to each INDEX in the query, and thereby generate a shared object file, based on the C-file generated, wherein the C-file generated comprises a structure and a mechanism to perform an operation on an INDEX based on an indexed column in the database, wherein the shared object file is a dynamic link library file;
wherein the generated C-file corresponding to each INDEX in the query is specific to a data-type of the indexed column in the database.

2. The device according to claim 1, wherein the instructions to natively compile the query includes instructions to:
create, based on the query received, the structure corresponding to the index;
generate, based on the query received, an access function for an index tuple value, and a request to find an appropriate slot for an index tuple;
store the structure created, the access function generated, and the access function generated in a buffer, and create the C-file based on the structure, the access function and the request;
compile the C-file created using a pre-stored compiler; and wherein the memory includes further instructions to instruct the processor to load the C-file along with at least one executable files in the device for an execution of the query.

3. The device according to claim 1, wherein the shared object file comprises a list of columns in the INDEX, an access function for an index tuple value, or an instruction to find an appropriate slot for an index tuple.

4. The device according to claim 1, wherein the shared object file comprises a function pointer generated for the INDEX, wherein the function pointer is stored in a relation descriptor table.

5. The device according to claim 1, wherein the C-file is generated based on the INDEX and the query received, and wherein the shared object file is generated by compiling the C-file generated.

6. The device according to claim 1, wherein the shared object file is used by an application, or other dynamic link library.

7. The device according to claim 1, wherein when the query is received, the instructions further comprise instructions to:
check if the INDEX received along with the query is schema bounded, wherein a flag is provided to indicate if tuple belongs to a schema bounded index; and
if the INDEX is schema bounded, utilize a function pointer stored into a corresponding relation descriptor associated with the INDEX, to call the shared object file generated for an execution of the query.

8. The device as claimed in in claim 1, wherein the query is received in a format comprising CREATE INDEX query along with [COMPILE] option.

9. A method comprising:
receiving, by a transceiver, a query for querying a database for making data available from the database;
identifying, by a processor, the query, wherein the query comprises a "CREATE INDEX" statement with a command to create a file by compiling the INDEX; and
natively compiling the query, by the processor, in response to the command, to generate a C-file corresponding to each INDEX in the query, and thereby generate a shared object file, based on the C-file generated, wherein the C-file comprises a structure and a mechanism to perform an operation on an INDEX based on an indexed column in the database, and wherein the shared object file is a dynamic link library file;
wherein the generated C-file corresponding to each INDEX in the query is specific to a data-type of the indexed column in the database.

10. The method according to claim 9, wherein natively compiling the query comprises:
creating, by the processor, based on the query received, the structure corresponding to the index;
generating, by the processor, based on the query received, specifically based on an INDEX definition given as part of CREATE INDEX command, an access function for an index tuple value, and an instruction to find an appropriate slot for an index tuple, wherein a number of access functions generated for each INDEX are always same;
storing, by the processor, the structure created, the access function generated, and the access function generated in a buffer;
creating, by the processor, the C-file based on the structure, the access function and the instruction;

compiling, by the processor, the C-file created using a pre-stored compiler; and loading, by the processor, the C-file along with an executable file for an execution of the query.

11. The method according to claim 9, wherein the shared object file comprises a list of columns in the INDEX, an access function for an index tuple value, or an instruction to find an appropriate slot for an index tuple.

12. The method according to claim 9, wherein natively compiling the query comprises: creating, by the processor, a system table for the INDEX, and thereby storing an option for compiling the INDEX, wherein the option is selected from a "true" if the command to create the file is present in the query or "false" if the command to create the file is absent from the query.

13. The method according to claim 9, wherein the shared object file comprises a function pointer generated for the INDEX, wherein the function pointer generated is stored in a relation descriptor table.

14. The method according to claim 9, wherein natively compiling the query comprises:

when the query has a command to compile the INDEX, generating the shared object file by compiling the C-file generated.

15. The method according to claim 9, wherein the shared object file is used by an application or other dynamic link library.

16. The method according to claim 9, wherein when the query is received, the method comprises:

checking, by the processor, if the INDEX received along with the query is schema bounded, wherein a flag is provided to indicate if a tuple belongs to a schema bounded index; and if the INDEX is schema bounded, utilizing, by the processor, a function pointer stored into a corresponding relation descriptor associated with the INDEX, to call the shared object file generated for an execution of the query.

17. The method according to claim 9, wherein the query is received in a format comprising CREATE INDEX query along with [COMPILE] option.

* * * * *